2,945,850

PURIFICATION PROCESS

Alfred E. Jurist, Brooklyn, N.Y., assignor to Olin Mathieson Chemical Corporation, New York, N.Y., a corporation of Virginia No Drawing. Filed Mar. 25, 1959, Ser. No. 801,733

4 Claims. (Cl. 260—210)

This invention relates to a process for the purification of an antibiotic composition. More particularly this invention relates to the process for removing boron from dihydrostreptomycin, prepared by subjecting streptomycin to a borohydride reduction process.

The term "streptomycin" and "dihydrostreptomycin" as used in this specification are intended to mean both the respective antibiotics per se, and their acid addition salts.

It is known that dihydrostreptomycin is a potent antibiotic highly effective against Gram positive organisms. It is also known that dihydrostreptomycin can be obtained from streptomycin by several different reduction processes. It is generally accepted that of the known processes for obtaining dihydrostreptomycin, the process which makes use of certain borohydrides is the most efficient. Such a process is taught in U.S. Patent No. 2,790,792, issued April 30, 1957.

While in most respects the borohydride reduction process is highly advantageous, one major difficulty with it lies in the recovery of a boron-free dihydrostreptomycin from the reduction mixture. It is necessary in order to obtain a useful medicament that the dihydrostreptomycin be completely or substantially free of boron. Yet when dihydrostreptomycin is prepared by a borohydride reduction, the boron in the form of borates, tends to form stable complexes with dihydrostreptomycin. Several different attempts have been made to separate and remove the borates which complex with dihydrostreptomycin, but none have been successful to the required extent.

It is an object of this invention to provide substantially boron free dihydrostreptomycin.

It is a further object of this invention to provide a process of treating borate containing solutions of dihydrostreptomycin so as to decompose substantially all the borate-dihydrostreptomycin complexes therein, thereby yielding a useful dihydrostreptomycin.

In accordance with this invention these and other objects are accomplished by treating a boron containing solution of dihydrostreptomycin with a certain class of anion exchange resins. The resin upon contacting the undesired boron-dihydrostreptomycin complex has the unexpected and highly desired effect of decomposing it and adsorbing the free borate ions, leaving behind the dissolved dihydrostreptomycin which may be further purified by crystallization in the form of a mineral acid salt, e.g., the sulfate. Since the boron-dihydrostreptomycin complexes are known to be highly stable, the decomposition thereof and removal of boron therefrom is surprising, since it would have been believed a priori that the complex would resist any such attempt of separation.

Other purification procedures for increasing the degree of purity; such as treatment to remove color or crystallization may be practiced in addition to the borate removal step, but this invention is not to be limited to the use or non-use thereof.

The starting antibiotic material for the practice of this invention may be obtained by the borohydride reduction of either pure or impure streptomycin (preferably in the acid-addition salt form). Thus, the instant starting material may be obtained by the reduction processes disclosed in said U.S. Patent No. 2,790,792.

The anion exchange resins which are useful in eliminating boron from dihydrostreptomycin mixtures are the products obtained by reacting certain amines with haloalkylated, cross-linked, insoluble copolymers of a monovinyl aromatic hydrocarbon and a compound which is copolymerizable with said monovinyl hydrocarbon and which contains at least two vinyl radicals. The desired resins can be prepared by a three step process. The first step involves the formation of the hydrocarbon copolymer by the polymerization of a monovinyl aromatic hydrocarbon such as styrene, a methyl styrene, an ethyl styrene, a vinyl naphthylene or a vinyl anthracene with a divinyl aromatic hydrocarbon such as divinyl benzene, a methylated divinyl benzene, a divinyl naphthalene, or an ethylated divinyl benzene. The second step involves the preparation of the haloalkylated copolymer by the reaction of the copolymer of the first step with a haloalkylating agent having the formula $R'—C_nH_{2n}—X$ wherein $n$ is an integer of from one to four, X is chloro or bromo, and R' is hydrogen, alkyl or alkoxy. The third and final step in the preparation of the desired resin is the reaction of the haloalkylated copolymer with an amine of the formula R—NH—Z, in which R is an aliphatic radical, such as alkyl (e.g. ethyl, lauryl, octadecyl, and preferably methyl); an aromatic radical, such as aryl (e.g. phenyl); or an aralipathic radical, such as aralkyl (e.g. benzyl) and Z is a pentahydroxyhexyl or a tetrahydroxypentyl group and is selected from the group consisting of sorbityl, mannityl, galactityl, talityl arabityl and ribityl.

The particularly preferred resin (herein called "XE-153") is the product obtained by the reaction of N-methyl-sorbitylamine with the product obtained by the reaction of the copolymer of styrene and divinyl benzene with chloromethyl methyl ether. Another useful resin is obtained when N-methyl-tetrahydroxypentylamine is substituted in this reaction. The herein useful anion exchange resins can be produced as described in detail in U.S. Patent Nos. 2,591,574 and 2,813,838, and are hereinafter referred to collectively in the specification and claims as a "polyhydroxyalkamino-alkylated styrene-copolymers."

The anion exchange resins should be in their free base form when contacted with the impure dihydrostreptomycin solution. If the resin has not been supplied in this form, it may be converted thereto by passing through a column filled with the resin, first a dilute solution of sulfuric acid and then distilled water until the effluent tests negative for sulfate with barium chloride, and then finally passing through it a solution of ammonium hydroxide until the effluent pH is 7.0. The amount of resin to be used depends on the boron capacity of the particular resin.

After contacting the borate-dihydrostreptomycin complex the resin can be reused. Before the reuse however, it will have to be regenerated to its free base form. The steps to be taken are identical to those described hereinbefore for converting the resin to its free base form.

In order to more fully illustrate the invention the following examples are presented, it being specifically understood that they are presented for the purposes of illustration, not limitation.

Example I 100 ml. of a streptomycin sulfate containing 32.5 million mcgm. of streptomycin base is adjusted to pH 8.0 with triethylamine and hydrogenated with 0.95 gm. of sodium borohydride. The resulting dihydrostreptomycin sulfate solution is adjusted to pH 7.0 with sulfuric acid and passed through a 100 ml. column packed with XE-153 resin. The column is washed twice with 100 ml. $H_2O$ per wash and the combined effluent and column washes are decolorized with carbon and concentrated to about 300,000 mcgm./milliliter. The dihydrostreptomycin sulfate is then obtained as a colorless crystalline solid by crystallization from an aqueous medium. The crystals contain less than 50 p.p.m. of boron.

*Example II*

125 ml. of a streptomycin sulfate solution containing 43.0 million mcgm. of streptomycin base is adjusted to pH 8.0 with triethylamine and hydrogenated with 1.25 gm. of sodium borohydride at 45° C. The resulting dihydrostreptomycin sulfate solution is adjusted to pH 6.0 with sulfuric acid and passed through a mixed resin column containing 1 milliliter of resin to 150,000 mcgm. of the antibiotic; the resin being a mixture of equal amounts of a nuclear sulfonic acid strongly acidic resin, i.e., "Amberlite XE 144," and a strongly basic polystyrene quaternary ammonium resin, i.e. "Amberlite" IRA400. The effluent from this column is adjusted to pH 7.0 and then passed through an XE-153 resin column as in Example I. The effluent is adjusted to pH 6.0, decolorized with carbon and concentrated to about 300,000 mcgm. of dihydrostreptomycin per milliliter. The dihydrostreptomycin sulfate is then obtained as a colorless crystalline solid by crystallization from an aqueous medium. The crystals contain less than 100 p.p.m. of boron.

In order to show that conventional resins are not effective in the removal of boron from dihydrostreptomycin solutions the following experiment was conducted:

250 ml. of streptomycin sulfate solution containing 43.8 million mcgm. of streptomycin base was adjusted to pH 8.0 with triethylamine and hydrogenated with 1.9 gm. of potassium borohydride. The resulting dihydrostreptomycin solution was then adjusted to pH 6.0 with sulfuric acid and passed through a mixed resin column comprising 200 ml. of a strongly acidic polystyrene nuclear sulfonic acid resin, i.e. "Amberlite" IR120, and a strongly basic resin, i.e., "Amberlite" IRA400. The effluent was adjusted to pH 6.0 and decolorized with carbon, then concentrated to about 300,000 mcgm./milliliter. The dihydrostreptomycin sulfate was then obtained as a colorless, crystalline solid by crystallization from an aqueous medium. The crystals contained 800 p.p.m. of boron.

It will be noted that in direct contrast to the resins of this invention, neither the conventional strongly acid or basic ion exchanger removed boron from the boron containing dihydrostreptomycin solution.

The invention may be variously otherwise embodied within the scope of the appended claims.

What is claimed is:

1. A process which comprises treating at a pH of about 7 a boron containing solution of dihydrostreptomycin with an ion exchanger which is an insoluble resin of a polyhydroxyalkamino-alkylated-styrene copolymer, and recovering the dihydrostreptomycin.

2. The process according to claim 1 in which the ion exchanger is the insoluble cross-linked resin of a N - methyl - sorbityl - amino - methylated - styrene-divinylbenzene copolymer.

3. The process according to claim 1 in which the dihydrostreptomycin is in the form of its sulfate.

4. In the process of purifying a boron containing dihydrostreptomycin sulfate solution the improvement which comprises contacting said solution at a pH of about 7 with the ion exchanger which is an insoluble resin of a polyhydroxyalkamino-alkylated-styrene copolymer selected from the group consisting of N-methyl-sorbitylaminomethylated - styrene - divinylbenzene and N - methyl - tetrahydroxypentylaminomethylated - styrene-divinylbenzene copolymers, and recovering a relatively boron free solution of dihydrostreptomycin sulfate.

No references cited.